March 17, 1964 R. W. MACZKA 3,125,428
METHOD FOR COATING SILICA RODS
Filed April 26, 1961 2 Sheets-Sheet 1

INVENTOR.
Romwald W. Maczka
BY
J. W. Douglas
His Attorney

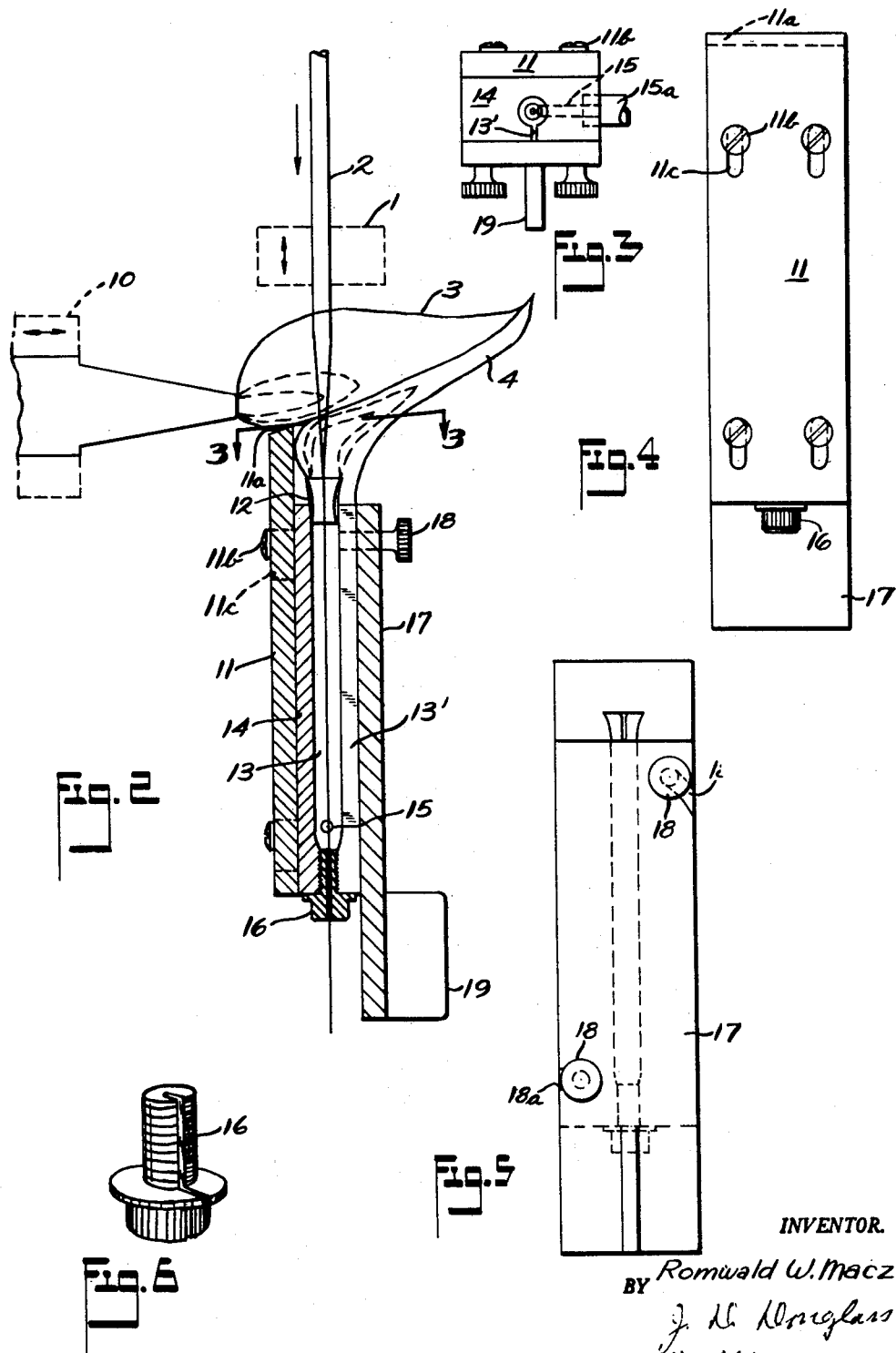

United States Patent Office 3,125,428
Patented Mar. 17, 1964

3,125,428
METHOD FOR COATING SILICA RODS
Romwald W. Maczka, 6744 Oakwood Drive,
Independence, Ohio
Filed Apr. 26, 1961, Ser. No. 105,768
2 Claims. (Cl. 65—3)

This invention relates to a process for coating silica fibres or filaments, while they are being drawn, with another material; more particularly, it relates to a high speed continuous process for simultaneously drawing silica fibres to a preselected diameter and depositing thereon, to a preselected thickness, a highly adherent coating which is mechanically and texturally superior to coatings being achieved by present pyrolytic deposition methods. The coating may be of carbon or other elements. It will be particularly described in conjunction with the application of a coating of elemental carbon, but it will be apparent to those versed in the art that the process will be useful for the application of other kinds of material, and is not limited to one material except as defined in the claims appended hereto.

It is the object of this invention to rapidly and economically produce a heretofore unavailable material in the form of long silica fibres possessing both a required specific diameter and a highly adherent mechanically firm coating of specific thickness or resistivity per unit length of fibre.

The product formed by the process of the invention has many uses. It enables electrical resistors to be made in a cheap and economical form. It provides a protective coating on the fibres as they are drawn and eliminates the creation of certain surface defects due to atmospheric attack. It is also useful in applying a coating to individual filaments which are brought together in the form of a bundle to make a flexible rod-like member for the conduction of light through the individual filament.

It is believed that the proper term for the deposition of the material is "pyrolytic deposition." Hereinafter certain hypotheses will be advanced to account for the results obtained. It should be understood, however, that the invention should not be limited, should it later be found that the results are attributed to another theory or mode of operation.

The term "pyrolytic deposition" is commonly interpreted as a phenomenon wherein a surface heated to above the temperature required to crack or dissociate a hydrocarbon gas, will do so when exposed to the gas, with the result that the free carbon so formed will attach to or combine with the heated surface, forming a carbon coat or film or carbonization of the surface. The specific scientific explanation of this "attachment" is unavailable, due to the complexity of the high speed chemistry of carbon formation in ignited gases. It appears likely, however, that this phenomenon of carbon depositing is initially one of electrical or chemical attraction due to ionization and that the subsequent coating adherence is due to the mechanical relationship between the film and the substrate.

The formation and growth of carbon particles in the cracked, or more accurately, ignited gas is also an open question but emperical observations indicate that in general, the longer a particle exists the larger it becomes, due either to coagulation or polymerization, or both. It is therefore essential that in any pyrolytic carbon depositing process, where a mechanically firm coat is desired, free of large carbon particles, provisions must be made to avoid attachment and inclusion in the film of these large sooty particles.

One method of accomplishing this is to establish a high relative velocity between the cracked gas and the substrate. This minimizes contact time of the substrate with environment wherein particle enlarging processes transpire. This method is not applicable in stationary processes where the history of growth and attachment of any single particle is unpredictable as is well known to those versed in the art.

From the foregoing the most apparent hypothesis is that if a small cylinder of silica be heated to above its surface dissociation temperature and moved in a direction parallel to its axis through a hydrocarbon gas, pyrolysis and carbon deposition on the cylinder would take place but with singular feature that the initial phase of the deposit would transpire during a high temperature interval wherein the surface of the silica has lost an oxygen atom to a reducing environment consisting of the free carbon and hydrogen of the cracked gas. The specific time and sequence of chemical combinations, breakdowns, and recombinations along a temperature gradient radiant from the cylinder defy analysis but the end products, as in any flame, appear to be water, carbon dioxide, and carbon.

The surface chemistry of our hypothetical cylinder is equally forbidding but the end result appears to be that the high temperature unstable silicon monoxide surface captures carbon in a valence bond, yielding a superior type of underlayment upon which the balance of the carbon depositing process takes place.

As our hypothetical cylinder continues its motion through the gas environment, gas cracking and carbon deposition continues until the temperature of the cylinder falls below the value at which pyrolysis takes place. Obviously the carbon coated cylinder must be retained in the environment until its temperature has fallen below that degree where the coating would be reduced by contact with air.

The forward progress of the cylinder creates a condition wherein the leading surface is constantly cracking new gas for its carbon fund. This results in the final carbon overlayment consisting only of small carbon platelets removed from the gas before any appreciable amount of coagulation or polymerization of carbon can transpire.

In practice this yields a smooth, hard, and bright metallic appearing finish.

The method I use to achieve the hypothesized conditions is to feed a fused silica rod, whose softening temperature is substantially in excess of dissociation temperature, into a heating flame and then drawing out the softened meniscus and applying it to a rotating drum. The input and output diameters are related to each other as the square root of the speed ratio. This phase of the process is simply a quartz or glass drawing process and its principles are known to those skilled in the art.

Beyond this point, the basic requirement to produce the coating is to subject the hot meniscus of the drawn rod to a gaseous hydrocarbon environment sufficiently long for its temperature to fall below oxidation temperature before exit from the environment.

For a better understanding of the invention, reference may be had to the accompanying drawings wherein:

FIG. 2 is a view, partially diagrammatic and partially in section, of an apparatus useful in carrying out the invention;

FIG. 3 is a top plan view taken from the line 3—3 of FIG. 1.

FIG. 4 is a back elevational view;

FIG. 5 is a front elevational view; and

FIG. 6 is a perspective view of a slotted screw.

Figure 1:
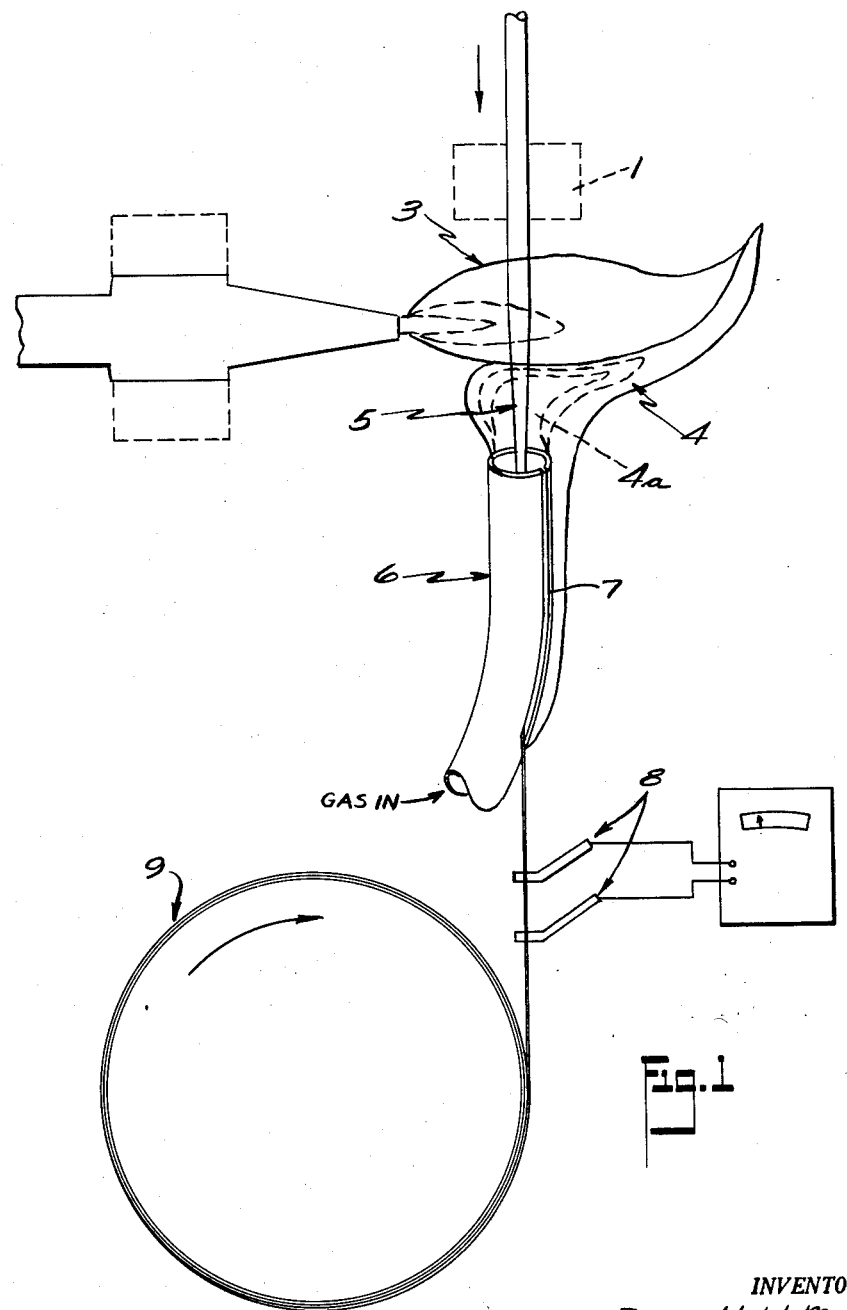
FIG. 1 is a diagrammatic view, partly in perspective, of a simple arrangement for accomplishing the objective.

Briefly, the invention contemplates providing a silica rod which may be quartz and which is heated by an oxygen-acetylene or similar flame which impinges on the rod from the side transverse to the rod until the rod is softened so that it may be drawn into a filament which is carried down and attached onto a winding drum.

The coating, which in this instance may be carbon, is attached to the rod by supplying a chamber around the filament with an exit close to the flame and providing gas in the chamber at sufficient pressure that it surrounds the filament and impinges against the heating flame where the excess may be burned. The combination of the flame and the pressure of the environmental gas enables the filament to be drawn in its highly heated condition directly into the gas where the pyrolytic deposition process takes place. The filament remains in the path of the gas sufficiently long that it is cooled, and no subsequent oxidation of the coating takes place.

Referring now to the drawings, throughout which like parts are designated by like reference characters, and particularly to FIG. 1, a mechanism, not shown in detail because many mechanisms for accomplishing the objective will be apparent, is indicated diagrammatically at 1, which moves a fused silica rod 2, in a direction as shown by the arrow, through a pre-mix heating flame 3 that elevates the rod to a temperature in excess of its dissociation temperature and up to a temperature where the rod viscosity is within the limits required to maintain a continuous draw around a rotating drum 9 on which the completed filament is wrapped. 6 is a curved metal tube having a slot 7 running from the top end down to the bend of the tube and of appropriate length and minimal width to accommodate the draw start and provide an exit for the drawn filament without undue loss of gas. A gaseous hydrocarbon is admitted at the lower end and is caused to flow upward through tube 6 where it impinges against the flame 3 and is ignited. The resultant diffusion flame 4 is bent outwardly substantially as shown. The pressure of the gas through the tube 6 is at such a velocity that meniscus 5 of the heated rod is positioned in or below the preheat zone 4a of the diffusion flame 4 generated by the exhaust burning of the hydrocarbon gas. Electrical brushes 8 may be provided, contacting the moving coated fibre preferably close to its point of emergence after coating, for the purpose of measuring electrical conductivity for a given length of fibre as an indirect indication of coating thickness, during the draw.

It should be particularly noted that the combined action of the heating flame 3, which is at right angles to the flow of gas coming from the chamber 13 and hence the flame 4, is such that the movement of the fibre from the heating zone into the deposition zone is substantially instantaneous.

FIGS. 2 to 6 inclusive provide a more detailed disclosure of one type of structure embodying the basic principles of FIG. 1, that has been found to be particularly effective in carrying out the invention. Means to perform the function of advancing or retracting the rod heating jet or orifice and consequently the flame 3 is illustrated diagrammatically at 10, thereby providing a variable heat control for controlling the temperature of silica rod 2. The remainder of the apparatus includes a flame forming baffle 11 which serves two functions, one being to provide a sharply defined boundary zone between heating flame 3 and the diffusion or environmental flame 4, and two, it makes spacing adjustment between environment orifice 12 and the top edge of the flame forming barrier 11, possible. It will be noted that the baffle has an inclined upper edge 11a which could also be curved transversely, if desired, and is adjustable as to height on the support or body 14 by means of screws 11b which extend through slots 11c in the baffle and are threaded into the support 14. A flared and slotted tubular insert 12 is provided in the upper exit end of a gas chamber 13 and serves the purpose of supplying improved anchorage for the diffusion flame 4. The main body 14 is formed from basic rectangular metal stock in which the chamber 13 is formed by drilling a hole to a distance short of the bottom. Another hole is drilled into the side (FIG. 3) near the bottom of the chamber 13 to provide a gas entry opening 15 into which the gas conducting tube 15a is connected. The body 14 is also slotted at 13' for its complete length, which slot extends from its front face into the chamber 13. In line with the axis of chamber 13 and at the bottom of body 14, is a drilled and tapped hole in which is disposed a slotted screw 16 (FIG. 6). A cover plate 17 is provided for the slotted front face of stock 14 and has a handle 19 on its lower end. The cover plate is held in position by screws 18, the cover having laterally extending slots 18a so that the screws do not have to be entirely removed to remove the cover.

All slots referred to exist for the purpose of starting the draw. Before starting the draw, cover plate 17 is removed, exposing the chamber slot 13' and the screw 16 is turned so that its slot is in line with the chamber slot. The draw is started through the aligned slots after which cover plate 17 is locked into position and screw 16 is rotated approximately ⅛ turn.

Screw 16 and coverplate 17 serve the purpose of minimizing chamber gas leakage and coating thickness variations resulting from random and irregular burning in areas of gas leakage.

The requirements as to the gases that may be used are not stringent. The premixed heating flame may consist of oxygen-hydrogen, or oxygen-acetylene, but oxygen-propane is preferred.

For the coating gas (environmental gas) it appears that a variety of both saturated and unsaturated hydrocarbons may be used. Those having lower cracking temperatures are preferred. A suitable variety for ratio mixing are acetylene, propane, and methane, and an inert diluent such as neon or argon.

In general, the parameters governing coating thickness are: heat of the draw, speed of the draw, output diameter of silica, type and ratio of environmental gas mixture, heat of environmental gas, and rate flow of environmental gas.

In practice, over a silica fibre diameter range of .010 inch down to .0002 inch and using take-up speeds from 9 to 7200 feet per minute, using various ratios of acetylene, propane, and methane mixtures, coating thicknesses yielding resistance values per inch ranging from 500 ohms to 100 megohms can be achieved.

The materials used, the chamber configurations illustrated, and the empirical results indicated, are not intended to delimit applicability of the principles involved, but to demonstrate a mode of achievement. Although I have mentioned the use of rods for the raw stock which when drawn provide solid fibres, it will be understood that the raw stock can be in other forms such as tubes which make fibres that may have a hollow core.

Having thus described my invention in an embodiment thereof, I am aware that numerous and extensive departures may be made therefrom without departing from the spirit or scope of the invention as defined in the appended claims.

I claim:

1. A process of pyrolytic deposition on silica consisting of the steps of continuously feeding a silica rod of preselected diameter at a specific rate into an adjustable heating flame, heating the rod until the heated section becomes viscous, drawing out a fiber from the viscous section, passing the drawn fiber immediately upon exit from the sharply defined heating zone coaxially and oppositionally through a moving gaseous hydrocarbon environment formed from gases from the group consisting of acetylene, propane, and methane and retaining the drawn fiber in the gaseous environment until its temperature has fallen below that degree where the coating would be reduced by contact with air.

2. A process of pyrolytic deposition on silica consisting of the steps of continuously feeding a silica rod of preselected diameter at a specific rate into an adjustable heating flame, heating the rod until the heated section becomes viscous, drawing out a fiber from the viscous section, passing the drawn fiber immediately upon exit from the sharply defined heating zone coaxially and oppositionally through a moving gaseous hydrocarbon environment formed from gases from the group consisting of acetylene, propane, and methane, which gases are impinged upon the side of the flame, and retaining the drawn fiber in the gaseous environment until its temperature has fallen below that degree where the coating would be reduced by contact with air.

References Cited in the file of this patent
UNITED STATES PATENTS

| | | |
|---|---|---|
| 1,771,055 | Pender | July 22, 1930 |
| 2,495,956 | Cook | Jan. 31, 1950 |
| 2,545,576 | Godley | Mar. 20, 1951 |
| 2,958,899 | Stein et al. | Nov. 8, 1960 |